(12) United States Patent
Danov et al.

(10) Patent No.: US 10,072,894 B2
(45) Date of Patent: Sep. 11, 2018

(54) THERMOCHEMICAL HEAT STORAGE UNIT

(71) Applicant: Siemens Aktiengesellschaft, Munich (DE)

(72) Inventors: Vladimir Danov, Erlangen (DE); Martin Kautz, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/527,516

(22) PCT Filed: Nov. 24, 2015

(86) PCT No.: PCT/EP2015/077432
§ 371 (c)(1),
(2) Date: May 17, 2017

(87) PCT Pub. No.: WO2016/091578
PCT Pub. Date: Jun. 16, 2016

(65) Prior Publication Data
US 2017/0321968 A1 Nov. 9, 2017

(30) Foreign Application Priority Data
Dec. 12, 2014 (DE) .................. 10 2014 225 696

(51) Int. Cl.
*F28D 15/00* (2006.01)
*F28D 20/00* (2006.01)
(Continued)

(52) U.S. Cl.
CPC .............. *F28D 20/003* (2013.01); *F01K 1/04* (2013.01); *F01K 5/00* (2013.01); *F28D 15/02* (2013.01);
(Continued)

(58) Field of Classification Search
CPC ........ F28D 20/003; F28D 15/02; F28D 15/06; F28D 17/04; F01K 1/04; F01K 5/00;
(Continued)

(56) References Cited

U.S. PATENT DOCUMENTS

| 4,319,626 | A | * | 3/1982 | Papazian | F25B 30/04 |
| | | | | | 122/21 |
| 5,269,145 | A | | 12/1993 | Krause et al. | 60/659 |

(Continued)

FOREIGN PATENT DOCUMENTS

| CN | 101680648 A | 3/2010 | ............... F01K 3/18 |
| CN | 101968043 A | 2/2011 | ............... F01K 11/02 |

(Continued)

OTHER PUBLICATIONS

International Search Report and Written Opinion, Application No. PCT/EP2015/077432, 11 pages, dated Feb. 17, 2016.

(Continued)

*Primary Examiner* — Davis Hwu
(74) *Attorney, Agent, or Firm* — Slayden Grubert Beard PLLC

(57) ABSTRACT

The present disclosure relates to thermochemical heat storage units. The teachings thereof may be embodied in systems and methods for operating, including charging and discharging, a thermochemical heat storage unit. For example, a method for operating a thermochemical heat storage unit may include: producing a first steam and feeding it to a heat exchanger; partially condensing the steam with release of its thermal energy, in the heat exchanger; subsequently pressurizing water condensed from the steam; feeding the pressurized water to the heat exchanger; evaporating the water into a second steam; and storing at least a portion of the second steam in a steam storage unit.

7 Claims, 1 Drawing Sheet

(51) Int. Cl.
*F28D 15/02* (2006.01)
*F28D 15/06* (2006.01)
*F01K 5/00* (2006.01)
*F01K 1/04* (2006.01)
*F28D 17/04* (2006.01)

(52) U.S. Cl.
CPC .............. *F28D 15/06* (2013.01); *F28D 17/04* (2013.01); *Y02E 60/142* (2013.01)

(58) Field of Classification Search
CPC ...... Y02E 60/142; F25B 30/04; F25B 17/083; B60H 1/3201
USPC .................................................... 165/104.12
See application file for complete search history.

(56) References Cited

U.S. PATENT DOCUMENTS

| | | | | | |
|---|---|---|---|---|---|
| 5,360,057 | A | * | 11/1994 | Rockenfeller | F25B 17/083 165/104.12 |
| 5,823,003 | A | * | 10/1998 | Rosser, Jr. | C09K 5/047 62/144 |
| 7,143,589 | B2 | * | 12/2006 | Smith | B60H 1/3201 62/94 |
| 9,863,673 | B2 | * | 1/2018 | Hirota | F25B 30/04 |
| 2010/0162700 | A1 | | 7/2010 | Birnbaum et al. | 60/641.8 |
| 2015/0219403 | A1 | | 8/2015 | Olcese | 60/641.8 |
| 2015/0252726 | A1 | | 9/2015 | Brunhuber et al. | 60/783 |
| 2016/0069218 | A1 | | 3/2016 | Lenk et al. | 60/775 |

FOREIGN PATENT DOCUMENTS

| | | | | |
|---|---|---|---|---|
| DE | 10260993 | A1 | 7/2004 | ............ F01K 3/00 |
| DE | 102010033571 | A1 | 2/2012 | ......... F28D 20/0056 |
| EP | 2256406 | A2 | 12/2010 | ............ F01K 1/00 |
| EP | 2444594 | A1 | 4/2012 | ............ F01K 1/04 |
| EP | 2708719 | A1 | 3/2014 | ........... F01K 23/10 |
| JP | 62162866 | A | 7/1987 | |
| WO | 2014/033132 | A1 | 3/2014 | ............ F01K 1/04 |
| WO | 2014/173572 | A2 | 10/2014 | ........... F01K 13/02 |
| WO | 2016/091578 | A1 | 6/2016 | ............ F01K 1/04 |

OTHER PUBLICATIONS

Japanese Decision to Grant, Application No. 2017531535, 2 pages, dated May 28, 2018.
Chinese Office Action, Application No. 201580067077.3, 5 pages, dated Jun. 20, 2018.

* cited by examiner

THERMOCHEMICAL HEAT STORAGE UNIT

CROSS-REFERENCE TO RELATED APPLICATIONS

This application is a U.S. National Stage Application of International Application No. PCT/EP2015/077432 filed Nov. 24, 2015, which designates the United States of America, and claims priority to DE Application No. 10 2014 225 696.8 filed Dec. 12, 2014, the contents of which are hereby incorporated by reference in their entirety.

TECHNICAL FIELD

The present disclosure relates to thermochemical heat storage units. The teachings thereof may be embodied in systems and methods for operating, including charging and discharging, a thermochemical heat storage unit.

The work that led to this invention was supported by the Seventh Framework Programme of the European Union [FP7/2007-2013] under Grant Agreement no 282889.

BACKGROUND

In solar thermal power plants, thermal energy can be acquired from solar radiation, for example by means of parabolic trough receivers or tower receivers. In such examples, the thermal energy is then transferred to a fluid which is thermally coupled to a steam circuit. The thermal energy, at that point in the form of high-temperature heat, can consequently be converted into electrical energy by means of the steam circuit.

The production of the electrical energy, however, is directly coupled to the solar radiation. According to the prior systems, to decouple the production of the electrical energy from the solar radiation, thermal heat storage units are integrated in the steam circuit of the solar thermal power plant. Depending on type and size, the thermal heat storage units are used to compensate for short-term (clouds) and/or medium-term (night) interruptions of the solar radiation. Typical systems employ concrete storage units, salt storage units, or high-pressure water storage units as thermal heat storage units.

SUMMARY

The teachings of the present disclosure may be embodied in systems enabling efficient storage of thermal energy by means of a thermochemical heat storage unit. For example, some embodiments may include methods for operating a thermochemical heat storage unit (2), in which, as a result of a charging operation (100) of the thermochemical heat storage unit (2), a first steam (40) is produced and fed to a heat exchanger (4), in which the first steam (40), with an at least partial release of its thermal energy, is at least partially condensed into water (41) by means of the heat exchanger (4), and in which the water (41) is subsequently pressurized, characterized in that the pressurized water (41) is returned to the heat exchanger (4) and, with an at least partial absorption of the thermal energy previously released, at least partially evaporated into second steam (42), which second steam (42) is at least partially stored in a steam storage unit (8, 9).

In some embodiments, the second steam (42) is fed to the thermochemical heat storage unit (2) during the discharging operation (101) of the thermochemical heat storage unit (2).

In some embodiments, a Ruths steam storage unit (9) is used as the steam storage unit (8, 9).

In some embodiments, the water (41) is pressurized to at least 0.5 MPa.

In some embodiments, the pressurized water (41) is heated prior to its return to the heat exchanger (4).

In some embodiments, fresh water (43) is fed to the pressurized water (41) prior to the return of the latter to the heat exchanger (4).

In some embodiments, at least part of the second steam (42) is used for producing fresh water (43).

BRIEF DESCRIPTION OF THE DRAWINGS

Further advantages, features and details of the teachings emerge from the exemplary embodiments described below and from the drawings, in which.

Figure 1:
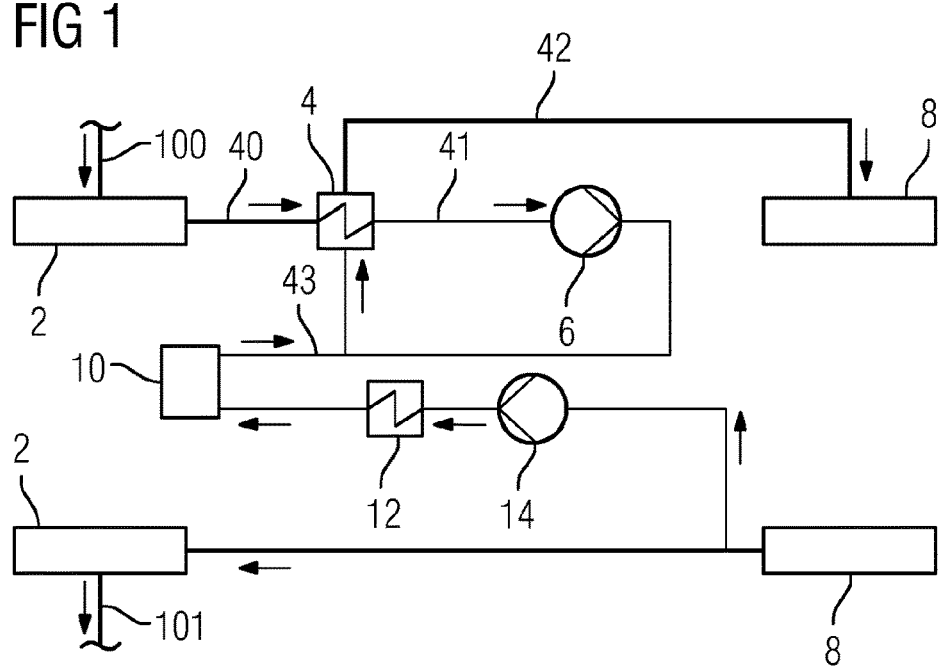
FIG. 1 shows a schematic circuit diagram for a charging operation or a discharging operation of a thermochemical heat storage unit, a steam produced during charging being stored at an elevated pressure level in a steam storage unit, according to teachings of the present disclosure.

Identical or equivalent elements may be denoted by the same reference signs in the figures.

DETAILED DESCRIPTION

In some embodiments, a method for operating a thermochemical heat storage unit may include, in a first step, producing a first steam as a result of a charging operation of the thermochemical heat storage unit. In a second step, the first steam is fed to a heat exchanger. In a third step, the first steam, with an at least partial release of its thermal energy, is at least partially condensed into water by means of the heat exchanger. In a subsequent fourth step, the water is pressurized. In other words, the pressure of the water is increased in the fourth step. Furthermore, in a fifth step, the pressurized water may be returned to the heat exchanger. In a sixth step, with an at least partial absorption of the thermal energy previously released in the third step, the pressurized water is at least partially evaporated into second steam. In a seventh step, the second steam is at least partially stored in a steam storage unit.

Recuperative cooling of the steam that forms during charging (first steam) thus takes place. The first steam which is at least partially liquefied is subsequently pressurized, that is to say the pressure is increased, and furthermore, with the at least partial absorption of the thermal energy released during the recuperative cooling, again heated or superheated in a recuperative manner. As a result, steam (second steam) is produced at an elevated pressure level compared to the first steam. Some embodiments include storage of the first steam in the form of the second steam which has a higher pressure than the first steam. Consequently, the storage volume of the steam storage unit is reduced compared to a direct storage of the first steam. The higher the pressure of the second steam, the smaller the required storage volume of the steam storage unit.

In some embodiments, prior to the pressurization (increasing of the pressure) of the condensed first steam (water), part of the thermal energy of the first steam is reacquired by means of the heat exchanger and transferred to the pressurized water for producing the second steam. As a result, the energy efficiency of the method is improved.

Furthermore, the energy required for increasing the pressure of the water is reduced and a storage-volume-saving storage of the first steam, in the form of the second steam, is made possible.

The methods described herein may be suitable for storing high-temperature heat, generated in the operation of a solar thermal power plant.

In some embodiments, the second steam is fed again to the thermochemical heat storage unit during the discharging operation of the thermochemical heat storage unit. As a result, the steam which is necessary for the discharging of the thermochemical heat storage unit is provided by the second steam. Typically, the steam fed to the thermochemical heat storage unit during discharging (second steam) must have a higher pressure than the steam produced during charging (first steam). The higher pressure is made possible due to the pressure of the water being increased and thus due to the second steam. Consequently, the storage of the steam produced during charging (first steam) is synergetically combined with the requirements for the pressure of the steam (second steam) during discharging.

In some embodiments, a Ruths steam storage unit is used as the steam storage unit. In a Ruths steam storage unit, the second steam is stored in the state of saturation. A particularly compact steam storage unit is thus provided.

The water may be pressurized to at least 0.5 MPa (megapascals). Consequently, the pressure may be increased to 0.5 MPa. In particular embodiments, the pressure of the water may be increased to at least 0.5 MPa and at most 2.0 MPa, and in some cases at most 1.6 MPa. A Ruths steam storage unit provides for an increase of the pressure of the water to at least 1.5 MPa. The stated pressure ranges allow, as a consequence, known steam storage units to be used. Generally, however, the pressure of the water can be adapted to the steam storage unit used.

In some embodiments, the pressurized water is heated prior to its return to the heat exchanger.

As a result, the evaporation of the water into second steam is supported. The heating of the pressurized water can for example occur in a recuperative manner by means of a further heat exchanger.

In some embodiments, fresh water is fed to the pressurized water prior to the return of the latter to the heat exchanger. The storage of the second steam is thereby supported and improved. Consequently, at the start of the charging operation, that is to say during a first and/or low production of the first steam, the recuperative cooling of the first steam and the production of the second steam are ensured. Here, a prior heating of the fed fresh water can be provided, for example in a recuperative manner.

In some embodiments, second steam stored in the steam storage unit can be used for producing fresh water. The fresh water that is thereby produced can be stored in a water storage unit and fed, for example with a temporal offset, to the pressurized water. Recuperative cooling of the second steam for producing the fresh water can be provided.

FIG. 1 shows a schematic circuit diagram for a charging operation 100 or discharging operation 101 of a thermochemical heat storage unit 2 according to the teachings of the present disclosure, the thermochemical heat storage unit 2 using CaO and Ca(OH)$_2$.

During the charging operation 100 of the thermochemical heat storage unit 2, a first steam 40 is produced. In the example shown, the first steam 40 has a temperature of 420° C. and a pressure of 0.01 MPa. The first steam 40 is fed to a heat exchanger 4 for recuperative cooling. As a result, the first steam 40 condenses at least partially into water 41. The water 41 as shown has a temperature of 46° C. and a pressure of 0.01 MPa. A pump 6 increases the pressure of the water 41 compared to the pressure of the condensed steam 40, said pump pressurizing the water 41 to 0.5 MPa, which is elevated compared to 0.01 MPa. The temperature of the water 41 remains approximately constant while the pressure is increased by the pump 6.

The pressurized water 41 is returned again to the heat exchanger 4. In the heat exchanger 4, the thermal energy of the first steam 40 is transferred to the pressurized water 41. As a consequence, a heating or superheating of the pressurized water 41 takes place, such that an evaporation of the pressurized water 41 into a second steam 42 occurs. In the example shown, the second steam 42 has a temperature of approximately 420° C. and a pressure of 0.5 MPa. The pressure of the second steam 42 is thus elevated compared to the pressure of the first steam 40. The temperature of the second steam 42 corresponds approximately to the temperature of the first steam 40, the temperature difference rating of the heat exchanger 4 possibly resulting in a temperature difference.

The second steam 42 is stored in a steam storage unit 8. On account of the elevated pressure compared to the first steam 40, a comparatively smaller storage volume is required for storing the second steam 42. A storage volume of the steam storage unit 8 of approximately $2 \cdot 10^6$ m$^3$, for example, is provided in the example shown. As a result, the second steam 42 with a mass flow rate of approximately 100 kg/s can be stored over a time period of 8 h.

During the discharging operation 101 of the thermochemical heat storage unit 2, the second steam 42 stored in the steam storage unit 8 is fed back to the thermochemical heat storage unit. However, the second steam 42 is fed at a pressure which is elevated compared to the pressure of the first steam 40. For example, the second steam 42 is fed at a temperature of 420° C. and a pressure of 0.5 MPa to the thermochemical heat storage unit 2. Here, the mass flow rate of the second steam 42 may be approximately 50 kg/s, for example over a time period of 16 h.

At least part of the stored second steam 42 can be pumped by a further pump 14 to a water storage unit 10 via a further heat exchanger 12. Here, recuperative cooling of the second steam 42 takes place within the further heat exchanger 12. This results in an at least partial condensation of the second steam 42. The condensed second steam 42 is stored in the water storage unit 10 and can be fed again in the liquid aggregate state to the pressurized water 41.

Figure 2:
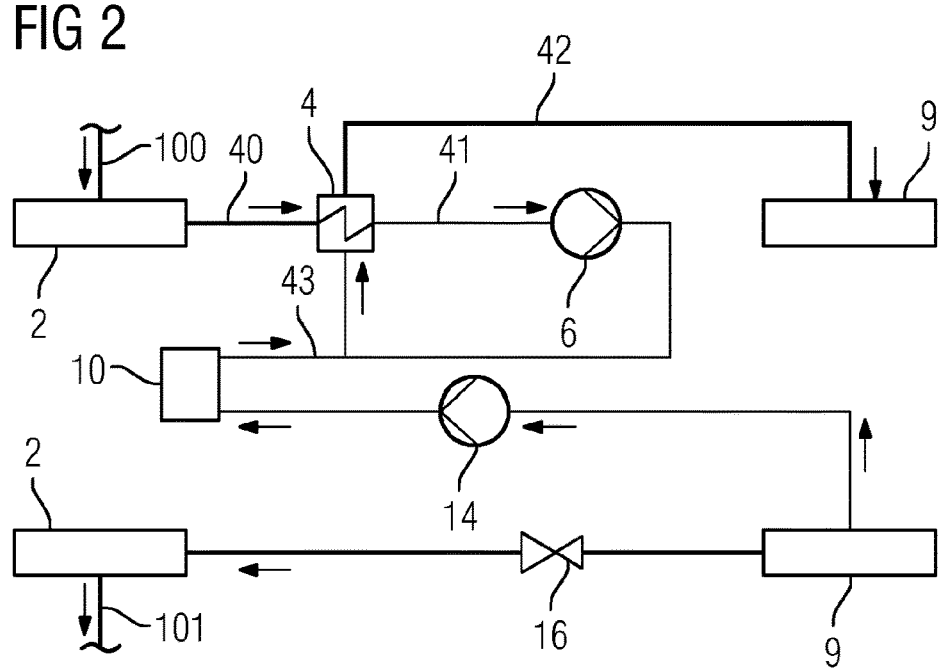
FIG. 2 shows a further schematic circuit diagram for a charging operation or a discharging operation of a thermochemical heat storage unit, a steam produced during charging being stored at an elevated pressure level in a Ruths steam storage unit.

FIG. 2 illustrates an example configuration of the schematic circuit diagram shown in FIG. 1. Here, FIG. 2 essentially shows the same elements as already shown in FIG. 1.

In FIG. 2, the second steam 42 is stored in a Ruths steam storage unit 9. In this example, the pressure of the water 41 is increased further compared to FIG. 1, with the water 41 being pressurized to 1.55 MPa. Here, the pressurized water 41 has a temperature of 46° C.

Furthermore, during the discharging of the thermochemical heat storage unit 2, the stored second steam 42 may pass through an expansion valve 16. In such embodiments, the pressure of the stored second steam 42 is reduced by the expansion valve 16, for example from 1.55 MPa to 0.5 MPa. Downstream of the expansion valve 16, the second steam 42 has a temperature in the range of 150° C. to 200° C. Furthermore, because of the use of a Ruths steam storage unit 9, recuperative cooling of the second steam 42 for producing fresh water 43 is not necessary, and so the further heat exchanger 12 from FIG. 1 is not required.

Although the teachings of the present disclosure have been specifically illustrated and described in more detail by the exemplary embodiments, the teachings are not limited by the examples disclosed or other variations can be derived here from by a person skilled in the art without departing from the protective scope of the claims below.

What is claimed is:

1. A method for operating a thermochemical heat storage unit, the method comprising:
   producing a first steam and feeding the first steam to a heat exchanger;
   at least partially condensing the first steam with an at least partial release of its thermal energy, by means of the heat exchanger; and
   subsequently pressurizing water condensed from the first steam;
   returning at least some of the pressurized water to the heat exchanger;
   at least partially evaporating the water into a second steam by absorbing thermal energy previously released; and
   storing at least a portion of the second steam in a steam storage unit.

2. The method as claimed in claim 1, further comprising feeding the second steam to the thermochemical heat storage unit during a discharging operation of the thermochemical heat storage unit.

3. The method as claimed in claim 1, wherein the steam storage unit comprises a Ruths steam storage unit.

4. The method as claimed in claim 1, wherein the water is pressurized to at least 0.5 MPa.

5. The method as claimed in claim 1, further comprising heating the pressurized water prior to its return to the heat exchanger.

6. The method as claimed in claim 1, further comprising adding fresh water to the pressurized water prior to the return of the latter to the heat exchanger.

7. The method as claimed in claim 6, further comprising using at least part of the second steam to produce fresh water.

* * * * *